(No Model.)
W. H. PAIGE.
DEVICE FOR CONSTRUCTING METAL CAR WHEELS.
No. 306,174. Patented Oct. 7, 1884.
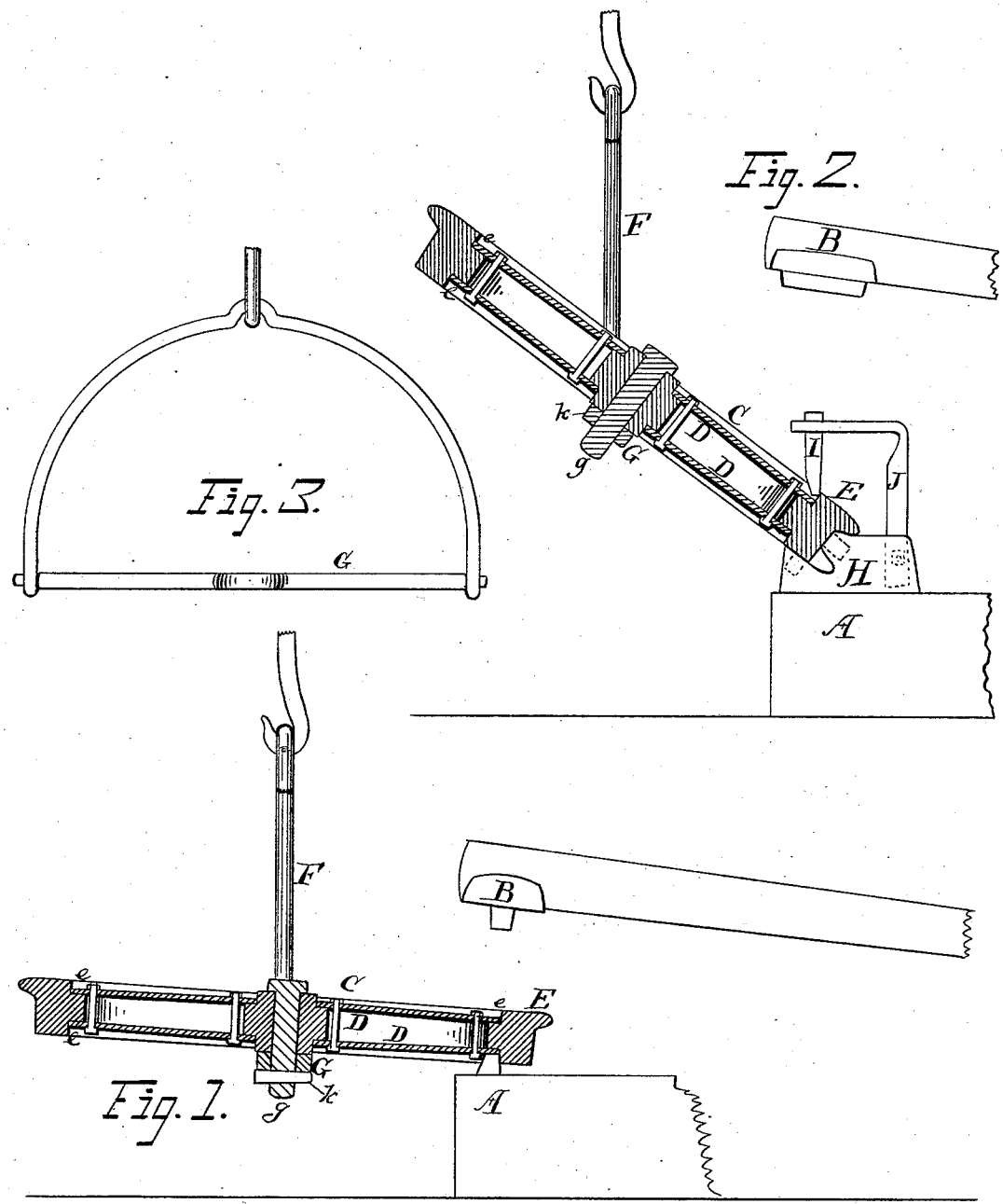
WITNESS,
F. R. Tibbitts.
Geo. B. Tibbitts.
INVENTOR,
Wm. H. Paige,
By Geo. W. Tibbitts Atty

UNITED STATES PATENT OFFICE.

WILLIAM H. PAIGE, OF CLEVELAND, OHIO.

DEVICE FOR CONSTRUCTING METAL CAR-WHEELS.

SPECIFICATION forming part of Letters Patent No. 306,174, dated October 7, 1884.

Application filed January 12, 1884. (No model.)

*To all whom it may concern:*

Be it known that I, WILLIAM H. PAIGE, of Cleveland, in the county of Cuyahoga and State of Ohio, have invented certain new and useful Improvements in Devices for Constructing Metal Car-Wheels, of which the following is a specification.

My improvements relate to devices for holding the wheel and for beating and setting the edge of the wrought-metal plates forming the web of the wheel into the annular channels in the tire, the object being to greatly facilitate the work, doing it in a uniform and perfect manner and at a great saving of time and expense. To accomplish these results, I employ a power-hammer and handle the wheel in connection with the hammer by means of a yoke or frame for holding the wheel suspended from an overhead tramway.

In the accompanying drawings, Figure 1 shows the means and manner of beating the edges of the web-plates into the channels of the tire. Fig. 2 shows the means and manner of setting the metal of the tire over the edges of the web-plates. Fig. 3 is a view of yoke.

Heretofore the work of beating down the edges of the metal plates has been performed by hand, requiring skill and consuming much time by the workmen, and also rendering the work of producing these wheels expensive. The performance of this work by machinery, as hereinafter described and claimed, greatly reduces the expense and labor and enables it to be accomplished in more expeditious and satisfactory manner.

A represents an anvil, and B a power-hammer. C represents a railway-car wheel, a patent for which was granted to me the 2d day of November, 1875, composed of two web-plates, D D, and a tire, E, having two annular channels, *e e*.

To set the edge of the metal of the web-plates into the channels firmly and closely to form a perfect impact of the metals is the object of this improvement, to do which I provide a yoke, F, for holding and suspending the wheel from a suitable tramway overhead, by which the wheel may be readily handled in turning it on the anvil while the hammer is working. The said yoke has a pivoted cross-bar, G, which is provided with a pin, *g*, for securing the wheel thereon, the pin passing through the hub and having a key, K, for holding the pin therein. By the use of this device the workman may easily turn the wheel on the anvil, and also turn the wheel over.

In Fig. 2 the anvil is seen provided with a form, H, which fits the outer rim of the tire. The wheel is applied at an angle of about forty-five degrees, the object being to upset a portion of the metal of the tire over onto the edge of the web-plates. To do this a tool, I, having a sharp edge, is held in position seen in Fig. 2 by an arm, J, adjustably attached to the side of the anvil, the hammer striking said tool in quick successive blows as the wheel is turned by the operator. When one side of wheel has been completed, the wheel is turned over in the yoke and the other side finished in the same manner as the first.

A sharp-edged wheel may be substituted for the tool I and rotated with power for upsetting the metal, but the means shown are preferable because of simplicity.

Having described my invention, I claim—

1. As an improvement in devices for setting the edges of web-plates of a car-wheel into the channels thereof and closely forming a perfect compact therewith, the combination, with a yoke having a pivoted cross-bar for holding and reversing the wheel, of an anvil provided with a form which fits the rim of the tire of said wheel, and a power-hammer for operating in connection with the form to beat and upset the metal of the web-plates and tire of the wheel, as shown and described.

2. The tool I and adjustable tool-holder J, in combination with an anvil, A, hammer B, and the yoke F, having a pivoted cross-bar for holding and reversing the wheel in an inclined position, substantially as specified.

WILLIAM H. PAIGE.

Witnesses:
E. W. LAIRD,
GEO. W. TIBBITTS.